United States Patent
Sherman, II

(10) Patent No.: US 7,356,901 B1
(45) Date of Patent: Apr. 15, 2008

(54) METHOD OF FORMING BUSHINGS BETWEEN GUIDE PINS AND GUIDE PIN BORES

(75) Inventor: William E Sherman, II, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 11/306,232

(22) Filed: Dec. 20, 2005

(51) Int. Cl.
  *B23P 17/00* (2006.01)
  *B23P 25/00* (2006.01)
  *B23P 11/02* (2006.01)
  *B29C 45/00* (2006.01)

(52) U.S. Cl. ............... 29/407.09; 29/407.1; 29/426.1; 29/458; 29/464; 29/527.1; 29/527.2; 264/328.1; 188/73.44; 403/13; 403/365

(58) Field of Classification Search ............ 29/407.09, 29/407.1, 445, 447, 458, 464, 465, 527.1, 29/527.2, 530, 426.1; 188/73.44; 264/299, 264/328.1, 342 R; 403/13, 243, 365
See application file for complete search history.

(56) References Cited

U.S. PATENT DOCUMENTS

| | | | |
|---|---|---|---|
| 2,689,755 A * | 9/1954 | Krotz | ............... 403/221 |
| 4,331,221 A | 5/1982 | Evans et al. | |
| 4,753,326 A | 6/1988 | Weiler et al. | |
| 5,927,446 A | 7/1999 | Evans | |
| 6,039,156 A | 3/2000 | Schneider | |
| 6,122,995 A * | 9/2000 | Gievers et al. | ........... 74/606 R |
| 6,533,079 B2 | 3/2003 | Charmat | |

* cited by examiner

*Primary Examiner*—Jermie Cozart
(74) *Attorney, Agent, or Firm*—Leo H. McCormick, Jr.; Sarah Taylor

(57) ABSTRACT

A disc brake having an anchor bracket fixed to a vehicle, a rotor fixed to and rotatable with a wheel and a caliper that spans the disc and supports a pair of opposed braking pads with respect to the rotor. Parallel alignment members fixed to the caliper and having a corresponding set of generally parallel bores for receiving the alignment members in the anchor bracket to allow limited relative movement and caliper translation during a brake application and subsequent release. Plastic inserts disposed intermediate an alignment member and a corresponding bore to provide a desired minimum running clearance there between. The plastic inserts being formed and remaining in situ within the respective bores through a sprues or gate that extend from and are generally transversely to a bore to align the alignment members with the bores and corresponding the braking pads with the rotor.

13 Claims, 4 Drawing Sheets

METHOD OF FORMING BUSHINGS BETWEEN GUIDE PINS AND GUIDE PIN BORES

This invention relates to a disc brake for a vehicle having a caliper and anchor bracket assembly and a method of providing a controlled running clearance between guide pins and bores in the anchor bracket for aligning the caliper with the anchor bracket and correspondingly brake friction pads and a rotor.

BACKGROUND OF THE INVENTION

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly, such as disclosed in U.S. Pat. No. 6,533,079, includes an anchor bracket or similar carrier which is secured to a fixed, non-rotatable component of the vehicle. A pair of brake pads are supported by a caliper on the anchor bracket for sliding movement relative to the anchor bracket. The brake pads have respective friction surfaces which are disposed on opposite sides of a brake rotor. The rotor, in turn, is connected to and rotatable with the wheel of the vehicle. To effect braking action, the brake pads are moved inwardly toward one another so as to frictionally engage the opposed sides of the brake rotor. Such frictional engagement causes retarding or stopping of the rotational movement of the brake rotor and, therefore, the wheel of the vehicle in a controlled manner.

The caliper selectively moves the friction pads into frictional engagement with the brake rotor through guide pins or other components that are slidably supported in the caliper housing relative to the fixed anchor bracket. The caliper housing is generally C-shaped, having an inboard leg adjacent the inboard brake pad and an outboard leg adjacent the outboard brake pad. One or more hydraulically or pneumatically actuated brake pistons are provided in respective cylindrical recesses. Early caliper brakes employed pistons in both the inboard and outboard portions of the caliper to actuate inboard and outboard brake pads respectively. More recently one or more pistons are located to one side of the disc, typically in the inboard leg of the caliper adjacent to the inboard brake pad. In these more recent arrangements, when the brake pedal is depressed, the piston and the inboard leg of the caliper are urged apart from one another so that the piston and inboard friction pad are urged axially outwardly, while the outboard leg of the caliper and outboard friction pad are urged inwardly. The piston is disposed adjacent to the inboard brake pad and, therefore, urges it outwardly toward the inner side of the rotor. Because the caliper is slidably mounted on the pins of the anchor bracket, the outboard leg of the caliper and outboard brake pad are urged inwardly toward the outer side of the rotor and as a result, the brake pads frictionally engage the opposed sides of the rotor. The pins may be fixed to the anchor bracket and slidably engage bores in the caliper, or the pins may be fixed to the caliper and slidably engage bores in the anchor bracket.

In order to reliably obtain the braking force from the disc brake system having the slide pin type guide, the slide pin should smoothly slide in the guide hole in the direction perpendicular to the disc. Variations in the size and location tolerances within the brake system detract from the desirable operation. Smoother operation may be achieved by employing a bushing of proper lubricity between the pin and hole. For example, U.S. Pat. Nos. 4,331,221 and 6,810,122 disclose bushing of electrometric material that form a portion of the bore in which a guide pin moves while damping bushing is shown in U.S. Pat. No. 4,753,326. All of these bushing arrangements are standardized, that is, are not designed and sized to fit a particular pin and bore. None of these bushings reduce tolerance variations among various pins and bores and none provide a proper minimal running clearance between the pin and bore and are not formed in situ, rather, they are all fabricated and later adapted to fit a particular pin/bore combination. Thus, it is desirable to minimize the cumulative effects of size and tolerance stack-up in a ZOH style caliper and anchor bracket assembly.

SUMMARY OF THE INVENTION

The present invention provides solutions to the above problems and drawbacks by forming a size and location tolerance reducing plastic bushing specifically designed for a particular pin/bore combination.

The invention comprises, a method of forming tolerance narrowing bushings between disc brake guide pins and another brake component such as an anchor bracket. A set of guide pins are preassembled into corresponding apertures or bores in the anchor bracket or other component by supporting the anchor bracket on a first fixture, supporting the guide pins on a second fixture, aligning the pins with corresponding apertures, and relatively moving the first and second fixtures toward one another. A plastic bushing material is next injected intermediate each pin and corresponding aperture. Maintaining a controlled shrinkage of the plastic material after injection provides proper minimal running clearance between the individual alignment pins and their corresponding apertures. The guide pins are disassembled from the bores and subsequently reassembled with each pin in the same aperture as during preassembly. The guide pins and bore containing component are maintained as a unique set and the injected plastic bushing material remains within the apertures between the steps of dissembling and reassembling.

An advantage of the present invention is that the cumulative effect of bore/pin size and tolerance accumulation are reduced.

An objective of the present invention is to reduce the cumulative effect of tolerances difference developed during manufacturing of a disc brake between a bore in an anchor and a pin that is designed to slide therein through the injection of a plastic material there between to bring the differences into a desired compliance and thereby reduce the cost of manufacturing.

Another advantage is the fabrication of a bore bushing and the insertion of a bore bearing are combined into a single in situ operation.

BRIEF DESCRIPTION OF THE DRAWINGS

Corresponding reference characters indicate corresponding parts throughout the several drawing views.

DETAILED DESCRIPTION OF THE INVENTION

Figure 1:
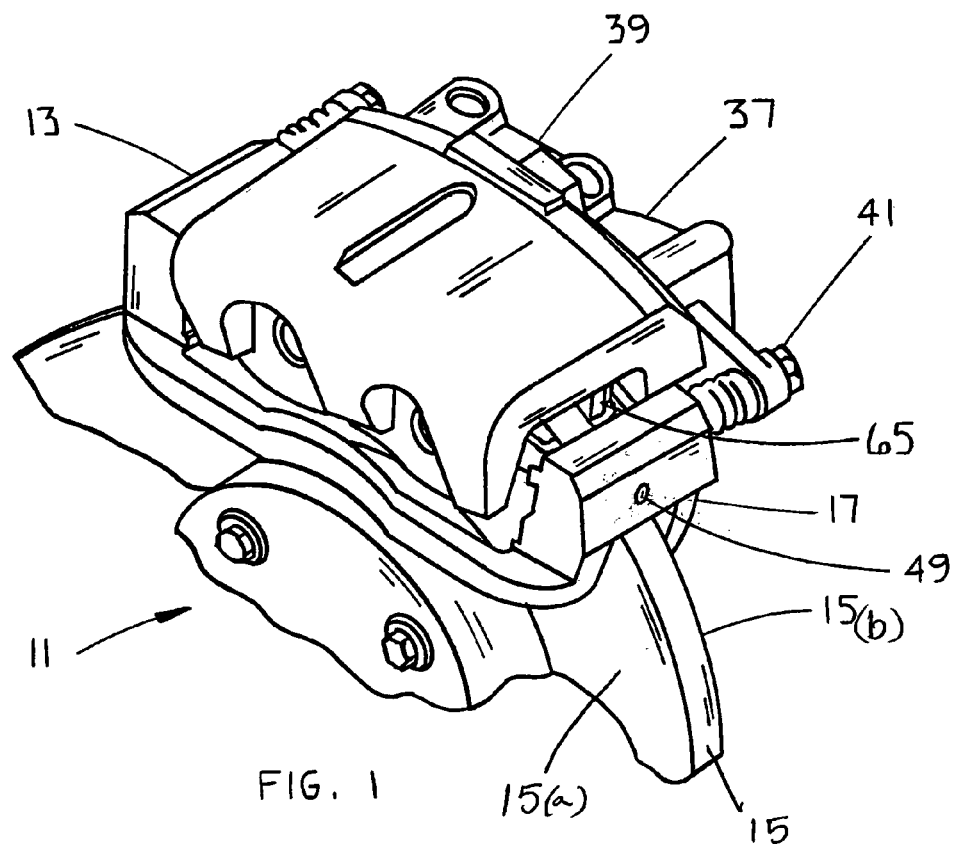
FIG. 1 is an isometric view of a disc brake assembly embodying the invention.
Figure 2:
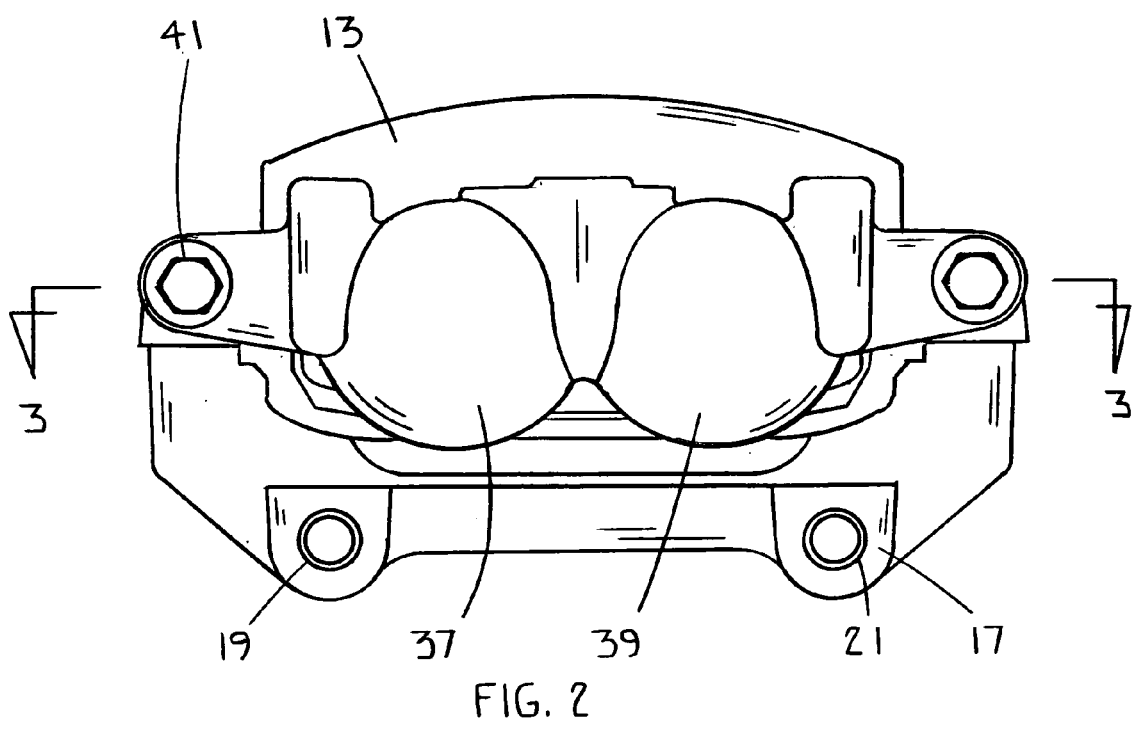
FIG. 2 is a side elevation view of the assembly of FIG. 1 taken along line 2-2 of FIG. 1.

Referring now to the drawings and particularly to FIG. 1, there is shown a disc brake assembly 11 for a motor vehicle with a caliper 13 that straddling a rotor 15. A carrier or anchor bracket 17 is fixed to the vehicle by bolts passing through mounting bosses 19 and 21 (FIG. 2). The caliper 13 includes cylinders 37 and 39 for housing pistons that are moved by pressurized fluid to effect a brake application. A guide means that includes guide pins 29 and 31 are reciprocally disposed in bores 67 and 69 of caliper 13 (FIG. 3) to allow the caliper 13 to slide relative to the anchor bracket 17 when the pistons are actuated by the pressurized fluid. First friction pad 65 and a second friction pad (not visible) are aligned with and respectively directed towards opposite faces 15a and 15b of the disc 15 that are retained between the pistons and the caliper 13 and are applied to the disc 15 when the pistons are actuated.

The guide means includes cantilevered first and second cylindrical guide pins 29 and 31 that are parallel to each other, each of which has a bound end fixed to the carrier or anchor 17 by bolts such as 41 and 43, and a free end. There are first and second respective bores 67, 69 made in the caliper 13 in which the first and second guide pins respectively slide. Hydraulic fluid connections, bleed screws and other conventional features are also shown in FIGS. 1 and 2.

Figure 3:
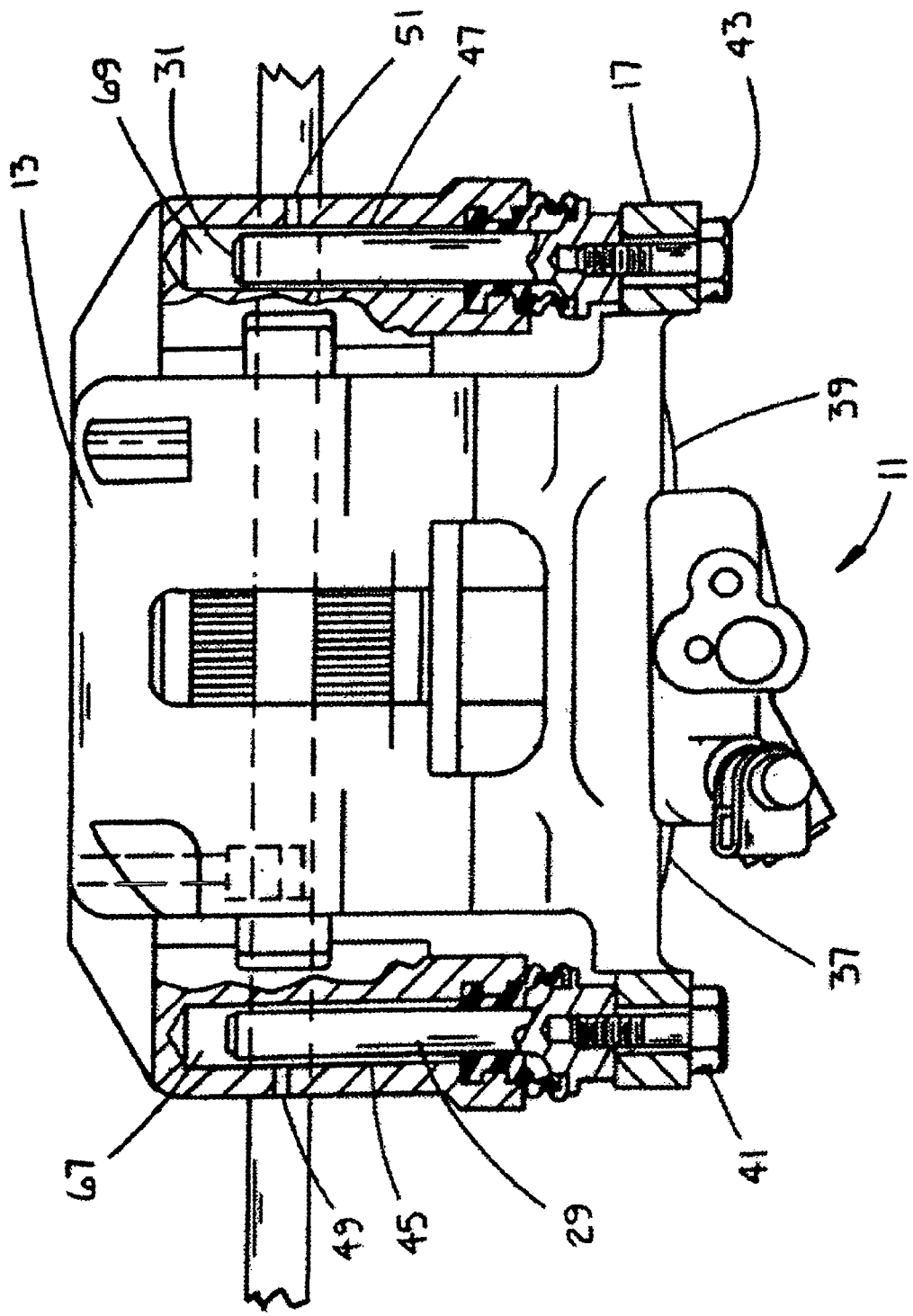
FIG. 3 is a top plan view of the assembly of FIG. 1, partly in cross-section along lines 3-3 of FIG. 2.

In FIG. 3, a plastic bushing has been injected into the regions 45 and 47 between the pins 29 and 31, and their respective bores 67 and 69 through gates or sprues 49 and 51. These bushings reduce the pin-bushing gap to a small and controlled value.

Figure 4:
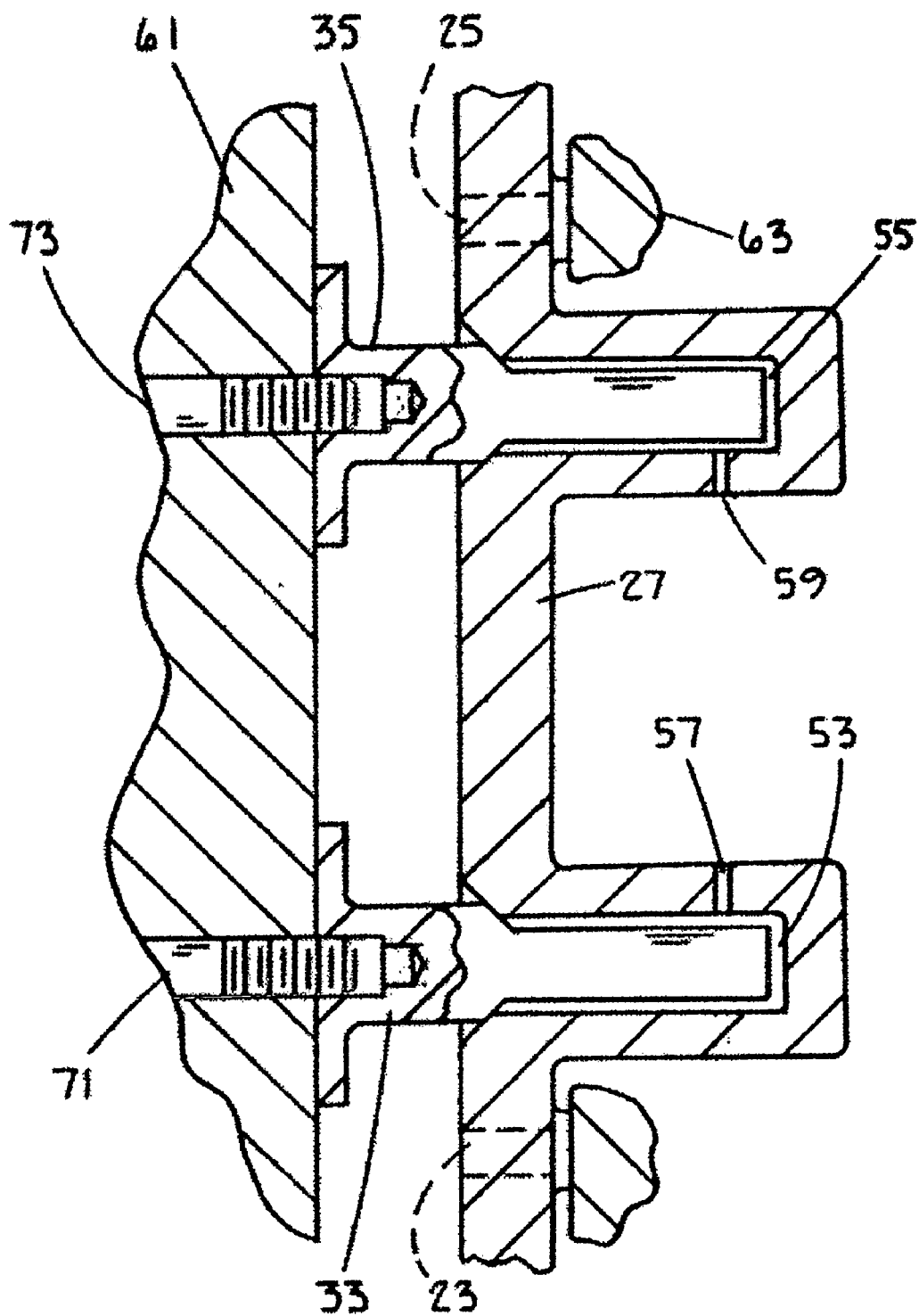
FIG. 4 is a cross-sectional view of a fixture arrangement for practicing a variation on the embodiment of FIGS. 1-3.

Note that FIGS. 1-3 illustrate the pins 29 and 31 being fixed to the anchor bracket 17 while the bores 67 and 69 in which they reside are in the caliper portion 13 it is anticipated that the roles could be reversed by placing the pins 33 and 35 on the caliper and the bores in the carrier or anchor bracket 27 as illustrated in FIG. 4.

In FIG. 4, the anchor bracket 27 is fixtured to structure 63 on its mounting bosses 23 and 25, and the caliper guide pins 33 and 35 are fixtured by temporary mounting bolts 71 and 73 in their assembly position on fixture 61. The caliper guide pins 33 and 35 are moved axially relative to the carrier or anchor bracket 27 to seal the ends of the pin bore in the anchor bracket. Sealing occurs where the tapers on the pins engage corresponding bore tapers. Plastic is then injected in the caliper guide through sprues 57 and 59 into oversized bores forming the bushings 53 and 55 to remove clearances between the pins and their corresponding bores. The plastic shrinkage is controlled to provide proper minimal running clearance. Any suitable mold release materials and/or techniques may be employed, if necessary, to insure that the plastic adheres to the bore inner sidewalls and shrinks free from the pins. A plastic could be selected that would provide adequate lubricity for proper slide force. The caliper guide pin and anchor bracket should be kept matched through the remainder of the assembly process. With somewhat more complicated fixturing arrangements, the bushings could be formed and remain in situ within the respective pin receiving bores. These same techniques may be employed with anchor bracket supported caliper guide pins which engage bores in the caliper as illustrated in FIG. 4.

Figure 5:
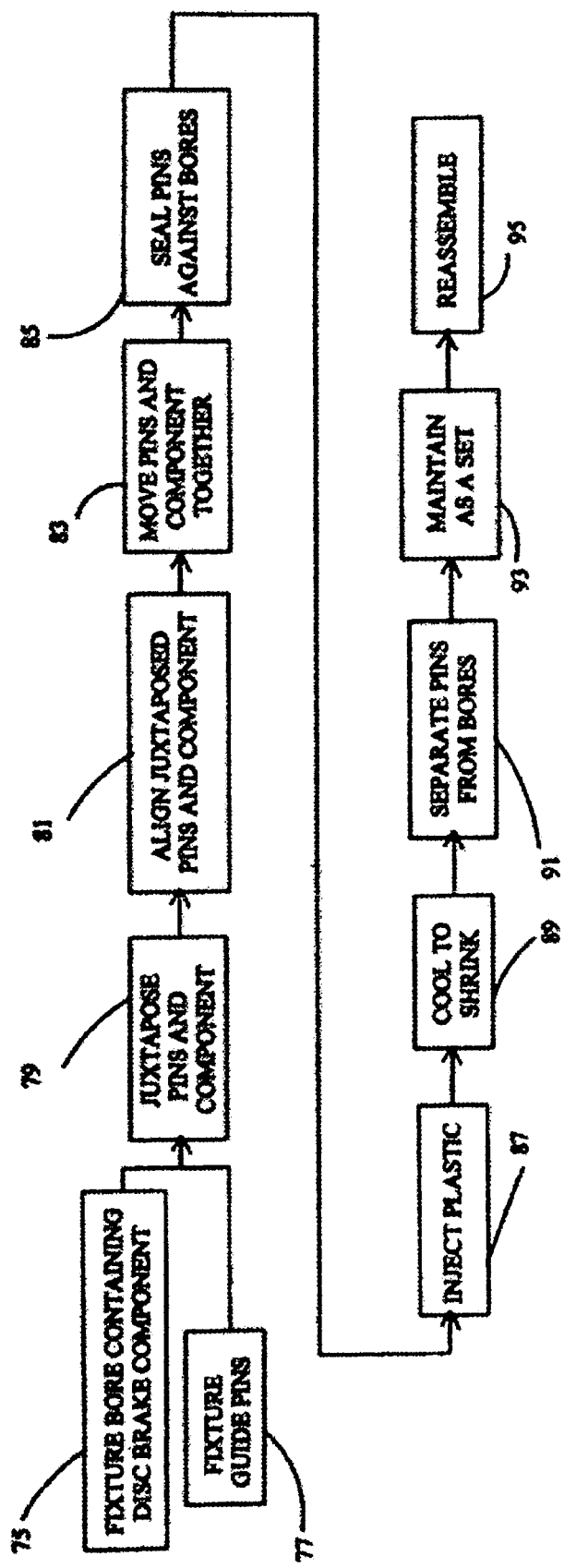
FIG. 5 is a block diagram summarizing the process of the present invention.

One process by which the customized tolerance reducing bushings may be created is summarized in FIG. 5. The plastic bushings are formed intermediate caliper guide pins 29, 31, 33 or 35 and corresponding guide pin bores such as 67 and 69 by first supporting a disc brake component having guide pin receiving bores in a first fixture and a set of disc brake caliper guide pins in a second fixture as illustrated at 75 and 77. In FIGS. 1-3, the component having the bores is the caliper 13 while in FIG. 4, the component is the anchor bracket 27. The first and second fixtures are juxtaposed at 79 and the set of guide pins aligned with their corresponding bores at 81. The step of aligning the set of guide pins with their corresponding bores is performed to position the pins generally centrally within oversized bores. Relatively moving the first and second fixtures toward one another causes the guide pins to be introduced into their respective bores as indicated at 83, and continued movement of the guide pins into their respective bores causes the pins to seal against the bores near the open ends thereof as shown at 85. A plastic material is then injected by way of the sprues 49 and 51, or 57 and 59 into gaps between the guide pins and corresponding bores to fill the gaps as at 87. The plastic material is then allowed to shrink at 89 thereby providing a desired running clearance between the guide pin and introduced plastic. As illustrated by steps 87 and 89, the fabrication of the bushing and the insertion of the bushing into the bore are performed as a single operation. Preferably, a controlled shrinkage of the plastic material after injection is maintained to provide proper minimal running clearance between the individual alignment pins and their corresponding bores. The fixtures are thereafter separated to remove the guide pins from their respective bores as seen at 91, and the pins and associated component are maintained at 93 as a matched set to be later reassembled at 95 and mounted on a vehicle. Because of dimensional variations among pins and apertures, at least some guide pins are uniquely fitted to their corresponding anchor bracket apertures. Desirably, the injected plastic material remains within the bores during the step 91 of separating.

What is claimed is:

1. A method of forming tolerance narrowing bushings between disc brake guide pins and an anchor bracket, comprising:

preassembling a set of guide pins into corresponding anchor bracket bores;

injecting a plastic bushing material intermediate each pin and a corresponding bore in said anchor bracket;

disassembling the guide pins and anchor bracket; and reassembling the guide pins and associated anchor bracket with each pin in the same bore as during the step of preassembling.

2. The method of claim 1, further including the step of maintaining the guide pins and associated anchor bracket as a unique set between the steps of dissembling and reassembling.

3. The method of claim 1, wherein the injected plastic bushing material remains within the anchor bracket bores between the steps of dissembling and reassembling.

4. The method of claim 1, wherein the step of preassembling includes supporting the anchor bracket on a first fixture, supporting the guide pins on a second fixture, aligning the pins with corresponding bores, and relatively moving the first and second fixtures toward one another.

5. The method of claim 1, including the additional step of maintaining a controlled shrinkage of the plastic material after injection to provide proper minimal running clearance between the individual alignment pins and their corresponding bore in said anchor bracket.

6. A method of creating plastic bushings intermediate caliper guide pins and corresponding guide pin bores, comprising:
   supporting a disc brake component having guide pin receiving bores in a first fixture;
   supporting a set of disc brake caliper guide pins in a second fixture;
   aligning said set of guide pins with corresponding bores in said disc brake;
   relatively moving the first and second fixtures toward one another to introduce the guide pins into their respective bores;
   injecting a plastic material into gaps located between the guide pins and corresponding bores to fill the gaps;
   allowing the plastic material to shrink to thereby provide a desired running clearance between each guide pin and corresponding injected plastic material; and
   separating the fixtures to remove the guide pins from their respective bores.

7. The method of claim 4, wherein the brake component comprises an anchor bracket and is supported on the first fixture by anchor bracket mounting bosses.

8. The method of claim 4, wherein the step of aligning the set of guide pins with their corresponding bores is performed to position the pins generally centrally within oversized bores.

9. The method of claim 4, wherein the injected plastic material remains within the bores during the step of separating.

10. The method of claim 4, including an additional step of maintaining a controlled shrinkage of the plastic material after injection to provide proper minimal running clearance between the individual alignment pins and their corresponding bores.

11. The method of claim 4, including the additional step of juxtaposing the first and second fixtures preparatory to aligning the set of guide pins with their corresponding bores.

12. The method of claim 4, including the additional step of continuing to move the guide pins into their respective bores after relatively moving the first and second fixtures toward one another until the pins seal against the bores near the open ends thereof.

13. The method of claim 4, including the additional step of maintaining the pins and associated component as a matched set to be later reassembled and mounted on a vehicle.

* * * * *